July 5, 1955  B. F. GRAVELY ET AL  2,712,301
FLUID MOTOR CONSTRUCTION
Filed Oct. 18, 1950  3 Sheets-Sheet 1
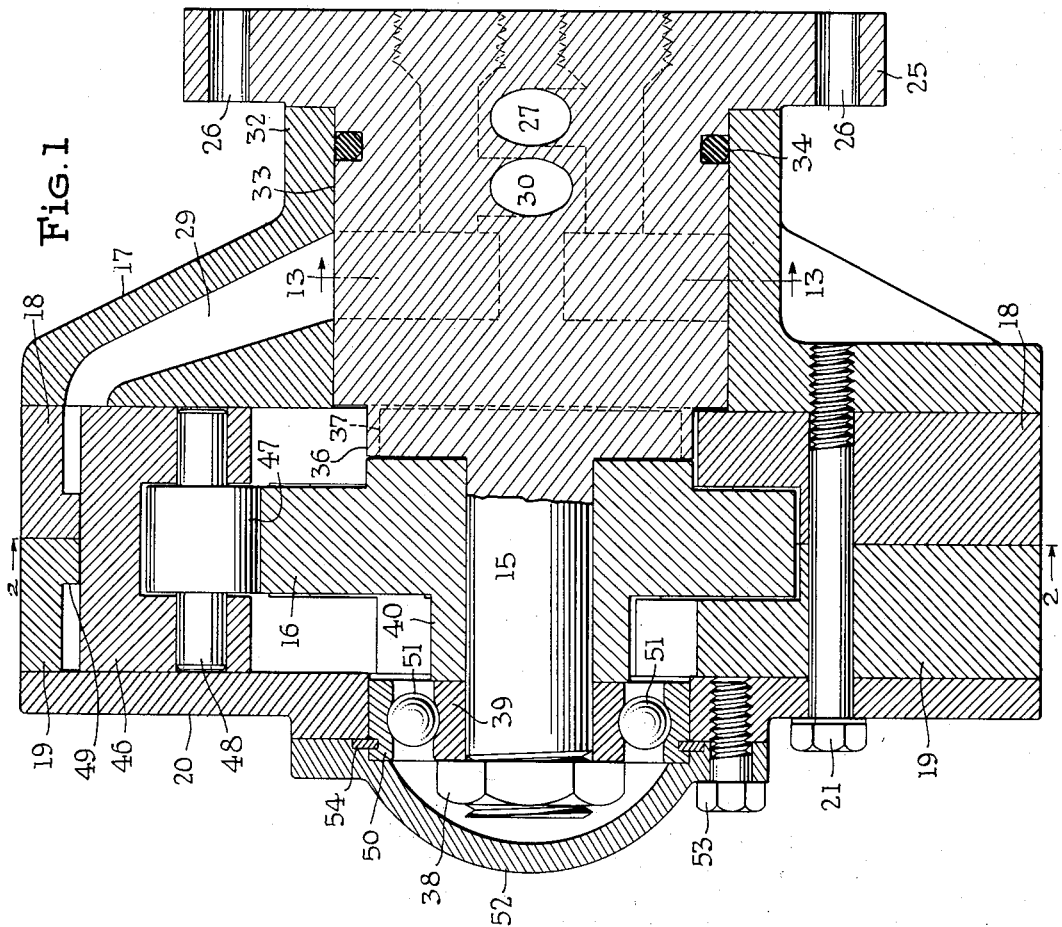
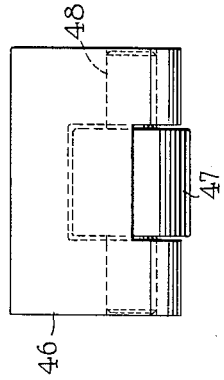
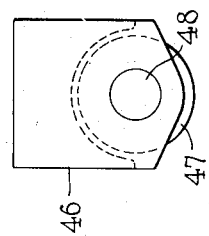
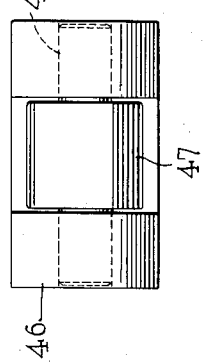
Inventor
Benjamin F. Gravely
and Charles B. Gravely
By
Donald E. Lane
Attorney July 5, 1955  B. F. GRAVELY ET AL  2,712,301
FLUID MOTOR CONSTRUCTION
Filed Oct. 18, 1950  3 Sheets-Sheet 2

Inventor
Benjamin F. Gravely
and Charles B. Gravely
By
Donald E. Lane
Attorney

July 5, 1955  B. F. GRAVELY ET AL  2,712,301
FLUID MOTOR CONSTRUCTION
Filed Oct. 18, 1950  3 Sheets-Sheet 3
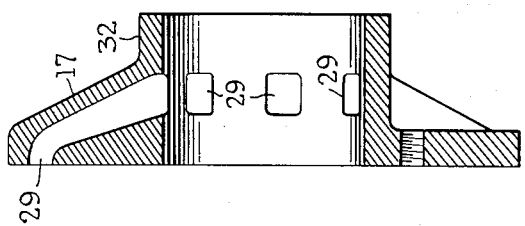
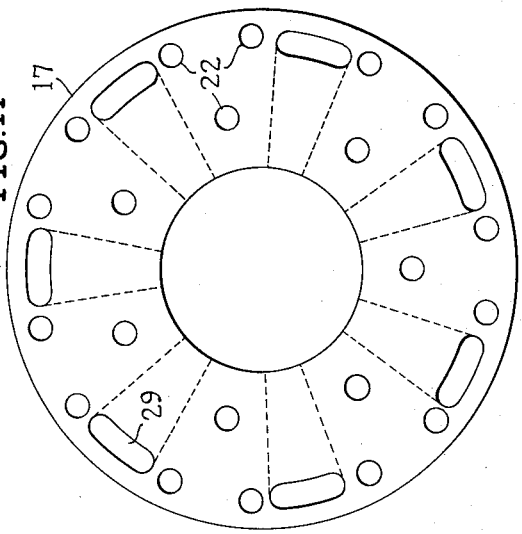
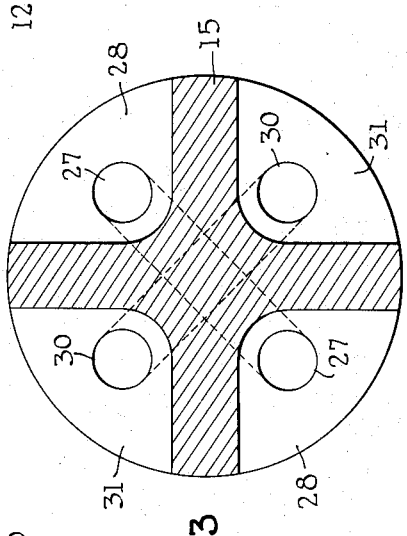
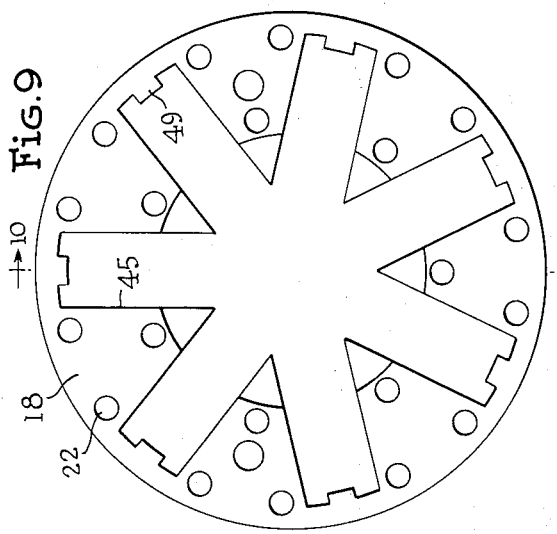
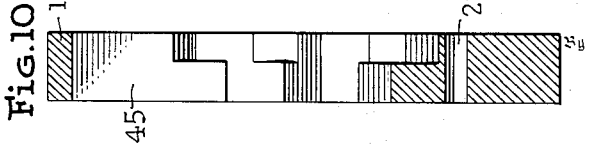
Inventor
Benjamin F. Gravely
and Charles B. Gravely
Donald E. Lane
Attorney

United States Patent Office 2,712,301
Patented July 5, 1955

2,712,301

FLUID MOTOR CONSTRUCTION

Benjamin F. Gravely and Charles B. Gravely, Nitro, W. Va.; Charleston National Bank, executor of the estate of said Benjamin F. Gravely, deceased Application October 18, 1950, Serial No. 190,836

1 Claim. (Cl. 121—59)

This invention relates to a hydraulic motor construction and more particularly to an improved motor adapted for use as a vehicle wheel or as a stationary source of driving power.

The use of hydraulic motors as vehicle wheels are known as disclosed in the patent to Joseph F. Joy, 2,418,123, issued April 1, 1947, or in the patent to Frederick Alfred Edward Jenkins, 1,963,091, issued June 19, 1934. Such known motors require a relatively large number of accurately made components and are costly to produce. The improved motor disclosed in this application is characterized by its relatively small number of parts each of which may be economically manufactured by simple casting and machining operations.

It is an object of this invention to provide a compact multi-cylinder motor construction in which the cylinder assembly rotates about a stationary cam shaped to utilize two power strokes by each piston for each revolution of the assembly.

It is a further object of this invention to provide a multi-cylinder motor construction having a fixed displacement, but adapted for operation at a variety of different speeds and different power outputs.

It is a further object of this invention to provide a multi-cylinder motor adapted for use on various types of power driven vehicles, as well as being adapted for use as a stationary source of driving power for winches, elevators, and the like.

It is a further object of this invention to provide a simple positive drive motor operated by fluid under pressure and not requiring connecting rods, crankshaft, cam-operated inlet and exhaust valves, or other complicated mechanisms.

The specific nature of the invention as well as other objects and advantages thereof will clearly appear from the description of the preferred embodiment illustrated in the accompanying drawings in which:

Figure 1 is a cross sectional view of a motor embodying our invention.

Figure 3 is an elevational side view of the piston shown in Figures 1 and 2.

Figure 4 is an elevational end view of the piston shown in Figure 3.

Figure 5 is a bottom view of the piston shown in Figure 3.

Figure 9 is an elevational side view on a reduced scale of one part of the four-part cylinder block shown in Figure 1.

Figure 10 is a sectional view taken on line 10—10 of Figure 9.

Figure 11 is an elevational side view on a reduced scale of another part of the four-part cylinder block shown in Figure 1.

Figure 12 is a sectional view taken on line 12—12 of Figure 11.

Figure 13 is a sectional view taken on line 13—13 of Figure 1.

Figure 2:
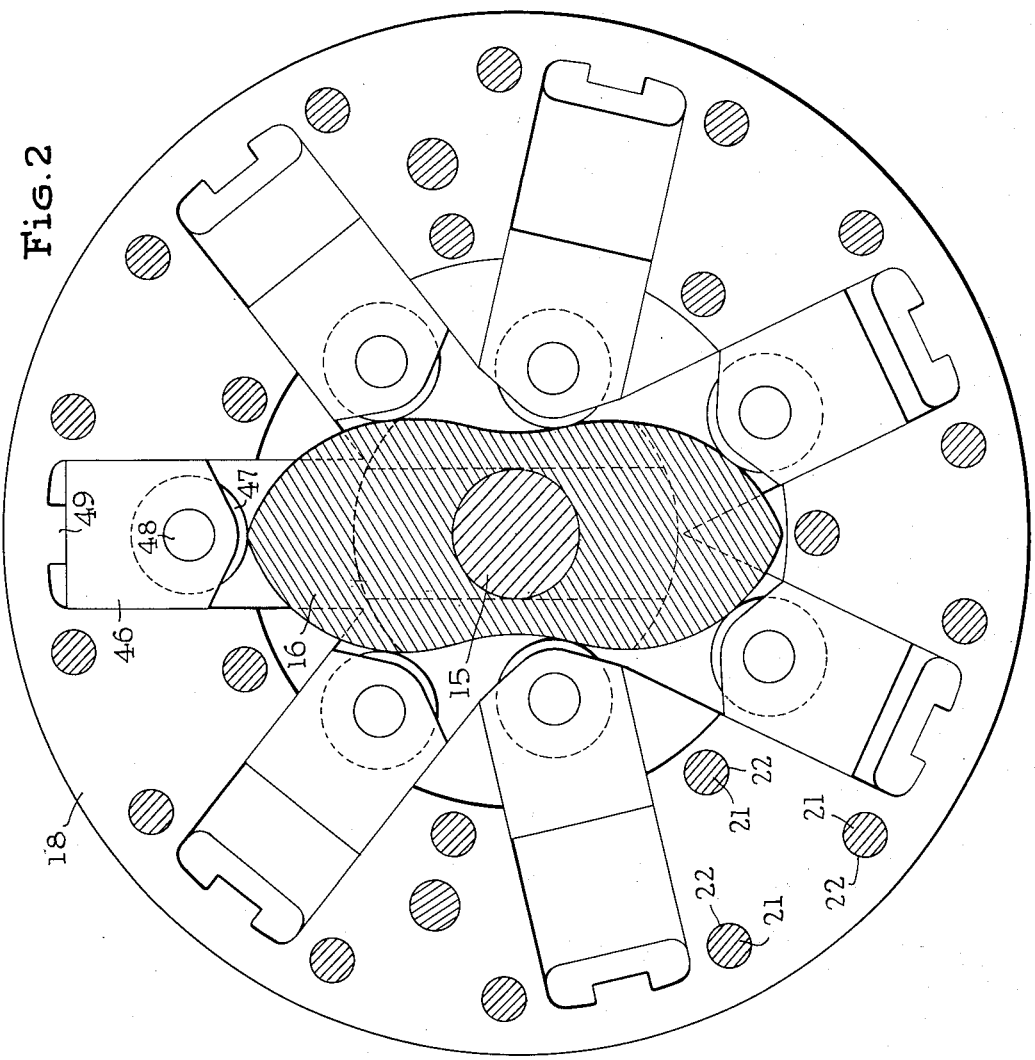
Figure 2 is sectional view taken on line 2—2 of Figure 1.

Referring to the drawings by characters of reference, there is shown in Figure 1 a motor construction including a stationary hub 15, a stationary cam 16 secured on the hub 15, and a four-part cylinder block having an inner member 17, a pair of cylinder-forming members 18 and 19, and a face member 20. The inner member 17 and the face member 20 are secured together with the cylinder-forming members 18 and 19 clamped therebetween by means of through bolts 21 extending through openings 22 shown in Figure 2.

The hub member 15 is provided with a flange 25 having bolt holes 26 by which the hub may be secured to the frame of a vehicle or to a stationary support for mounting the entire motor assembly. An inlet passage 27 is provided in the hub member 15 for the admission of fluid under controlled pressure and volume. A pair of segmental ports 28 are provided in the periphery of hub 15 as shown in Figure 13 for admitting fluid from the inlet 27 to passages 29 in the member 17. An exhaust passage 30 is also provided in the hub member 15 for exhausting operating fluids from the passages 29 through the pair of segmental exhaust ports 31. The member 17 is provided with a projecting bushing 32 for rotation on the bearing portion 33 of the stationary hub 15, a conventional sealing or packing ring 34 being provided between the portion 33 and the bushing 32.

Figure 7:
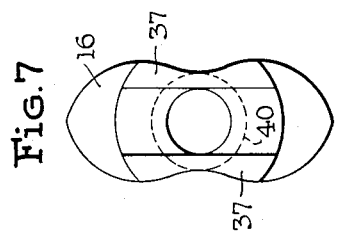
Figure 7 is an elevational end view of the cam shown in Figure 6.
Figure 8:
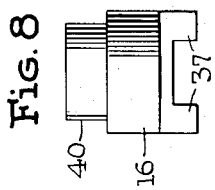
Figure 8 is a plan view of the cam shown in Figure 6.
Figure 6:
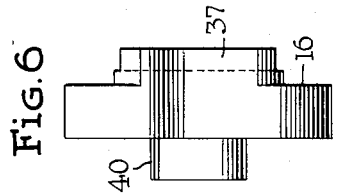
Figure 6 is an elevational side view on a reduced scale of the cam shown in Figures 1 and 2.

The hub member 15 is also provided with shoulders 36 having flat parallel sides engaged by projecting flanges 37 on the inner side of cam 16. The cam 16 is rigidly secured to the hub 15 by means of a nut 38 engaging the bearing race 39 which latter engages the sleeve 40 projecting from the outer side of the cam 16. The flanges 37 prevent the cam 16 from turning on the hub 15. For the seven cylinder motor shown, the cam 16 is provided with the peripheral shape illustrated in Figures 2 and 7. The cam 16 preferably has two high points opposite one to the other as shown, but may have more than two high points, and in such case there should be as many inlet ports 28 as there are high points on the fixed cam.

The cylinder-forming members 18 and 19 are similar rings provided with radial channels 45 in their abutting faces. The channels 45 form radial cylinders, preferably of oblong cross-section to receive the free-floating pistons 46 therein. Each piston 46 is provided with a recess in its inner end to receive a bearing roller 47 journaled on a pin 48 secured in the piston 46 and extending across said recess. The bearing roller 47 projects below the lower end of the piston 46 for engagement with the peripheral surface of the cam 16. The cylinder forming members 18 and 19 may be provided with inwardly projecting portions 49 at the outer end of each channel 45 to serve as bumpers or stops limiting the outward movement of pistons 46.

The face member 20 has a central aperture fitted with a bearing race 50 opposite the inner race 39, and ball bearings 51 are positioned between the races 50 and 39. A removable closure cap 52 is bolted to the face member 20 by bolts 53 to cover the outer end of the hub member 15 and a sealing gasket or ring 54 is provided between the cap 52, the face member 20 and the outer race 50 to prevent leakage of operating fluids and to secure the race 50 against sliding in the member 20. Removal of the cap 52 provides access to the nut 38, and removal of the nut 38 permits sliding the assembled members 17, 18, 19, and 20, along with cam 16 off from the fixed hub member 15. Removal of the through bolts 21 permits separation of the members 17, 18, 19, and 20, from one another so that the pistons 46 may be replaced and the grooves 45 forming the cylinder walls may be serviced. The pistons 46 may be of one piece as shown, or may be split pistons, and may have packing rings or the like, as is well known in the art.

In operating the motor illustrated, a controlled source of fluid under pressure is connected to the inlet 27 from which it flows to the pair of segmental ports 28 and thence through passages 29 in the member 17 to the peripheral end of opposing cylinders formed by grooves 45 in members 18 and 19. Free floating pistons 46 in said pressurized cylinders are forced radially inward by the fluid pressure, the piston rollers 47 thereby exerting a force on the periphery of cam 16 causing the members 17, 18, 19 and 20 to rotate around the longitudinal axis of the fixed hub 15 and fixed cam 16. As a piston reaches one of the low points of the cam 16, the passage 29 to the cylinder of said piston is disconnected from an inlet port 28 and connected to an outlet port 31. Fluid pressure above the piston is then exhausted through the exhaust port 30 while continued rotation causes the cam to move the piston radially outward to the minimum displacement position where passage 29 again becomes an inlet passage to repeat the thrust cycle. In the construction illustrated, each piston applies two thrust strokes against the cam 16 during each complete revolution of the members 17, 18, 19, and 20 about the cam and hub. By reversing the inlet and outlet connections 27 and 30, the motor may be operated in either direction of rotation. By controlling the volume of fluid delivered to the motor the speed of rotation may be controlled. By controlling the inlet and exhaust pressures, the torque produced by the motor may be controlled.

A wheel rim or tire may be secured by lugs to the periphery of the rotatable assembly for use of the motor as a wheel motor for vehicles such as passenger vehicles, trucks, tractors, power forming implements and the like. The motor illustrated is also adapted to have the hub flange 25 secured to a fixed foundation and to have a drum or pulley secured to the periphery of the rotatable assembly for use in operating winches, elevators, and other belt or cable operated devices.

The type of motor disclosed may be accelerated or decelerated through wide limits by the use of interconnected valves governing the flow of fluids to and from the motor. The motor may be locked in the non-rotatable position by closing both inlet and exhaust line valves.

It will also be apparent that the supporting flange 25 may be secured to a king pin where the motor is used to drive a steerable wheel of a motor vehicle. However, the fluid pressure supply and control means, and motor mounting means, usable with the motor construction illustrated and described form no part of the present invention. Structural changes which retain the principles of the invention described will be readily apparent to one skilled in the art, and our invention covers all embodiments which come within the spirit and scope of the following claim.

We claim:

A fluid motor comprising in combination: a stationary hub member, a stationary cam secured on said hub member, an inner member rotatable on said hub and having a flat outer face perpendicular to the axis of rotation, complementary inner and outer cylinder forming rings each having flat and parallel inner and outer faces and each having a plurality of radial slots having flat parallel sides and extending outwardly from the center portion of said rings and terminating inward from the periphery of said rings, the inner face of the inner ring engaging the flat outer face of said inner member, an outer member having a flat inner face engaging the flat outer face of the outer ring, said inner member, slotted rings and outer member being secured together as a unit with the slots of said ring members aligned defining a plurality of radial cylinders of oblong cross-section and terminating inward the periphery of said ring members, and a free piston of oblong cross-section in each cylinder and engagable with the periphery of said stationary cam, said hub member and said inner member having a plurality of passageways and parts therein for admitting and exhausting fluid to an dfrom the outer ends of said cylinders.

References Cited in the file of this patent

UNITED STATES PATENTS

| | | |
|---|---|---|
| 570,528 | Wyeth | Nov. 3, 1896 |
| 1,420,009 | Wilson | June 20, 1922 |
| 1,874,010 | Hess | Aug. 30, 1932 |
| 1,906,787 | Cuttat | May 2, 1933 |
| 2,350,683 | Jossim et al. | June 6, 1944 |
| 2,418,123 | Joy | Apr. 1, 1947 |

FOREIGN PATENTS

| | | |
|---|---|---|
| 49,646 | Austria | Aug. 25, 1911 |
| 11,763 | Great Britain | May 17, 1912 |